(12) United States Patent
Mu (10) Patent No.: US 11,852,735 B2
(45) Date of Patent: Dec. 26, 2023

(54) NAVIGATION ENHANCEMENT METHOD AND SYSTEM

(71) Applicant: Beijing Future Navigation Technology Co., Ltd, Beijing (CN)

(72) Inventor: Xucheng Mu, Beijing (CN)

(73) Assignee: Beijing Future Navigation Technology Co., Ltd, Beijing (CN)

( * ) Notice: Subject to any disclaimer, the term of this patent is extended or adjusted under 35 U.S.C. 154(b) by 477 days.

(21) Appl. No.: 15/734,726

(22) PCT Filed: Nov. 23, 2018

(86) PCT No.: PCT/CN2018/117071
§ 371 (c)(1),
(2) Date: Dec. 3, 2020

(87) PCT Pub. No.: WO2019/233046
PCT Pub. Date: Dec. 12, 2019

(65) Prior Publication Data
US 2021/0239855 A1    Aug. 5, 2021

(30) Foreign Application Priority Data

Jun. 4, 2018    (CN) .......................... 201810566046.8

(51) Int. Cl.
*G01S 19/51*        (2010.01)
*G01S 19/07*        (2010.01)
(Continued)

(52) U.S. Cl.
CPC ............ *G01S 19/51* (2013.01); *G01S 19/073* (2019.08); *G01S 19/11* (2013.01); *G01S 19/256* (2013.01); *G01S 19/55* (2013.01); *H04B 7/18521* (2013.01)

(58) Field of Classification Search
CPC .................................................. H04B 7/18521
See application file for complete search history.

(56) References Cited

U.S. PATENT DOCUMENTS 6,373,432 B1    4/2002    Rabinowitz
6,480,788 B2    11/2002   Kilfeather
(Continued)

FOREIGN PATENT DOCUMENTS

CN        103176188 A     6/2013
CN        103344978 A     10/2013
(Continued)

OTHER PUBLICATIONS

Preliminary Amendment dated Dec. 2, 2020 from U.S. Appl. No. 15/734,446.
(Continued)

*Primary Examiner* — Bernarr E Gregory
*Assistant Examiner* — Hailey R Le
(74) *Attorney, Agent, or Firm* — James E. Walton (57) ABSTRACT

The present application provides a navigation augmentation method and system, the method includes: broadcasting, by satellites of a Low Earth Orbit (LEO) constellation, navigation direct signals and navigation augmentation information; performing, by a user receiver, precise positioning, speed measurement and timing according to the navigation direct signals of navigation satellites, the navigation direct signals of the LEO satellites and the navigation augmentation information broadcasted by the LEO satellites.

9 Claims, 4 Drawing Sheets

(51) Int. Cl.
  *G01S 19/11* (2010.01)
  *G01S 19/25* (2010.01)
  *G01S 19/55* (2010.01)
  *H04B 7/185* (2006.01)

(56) References Cited

U.S. PATENT DOCUMENTS

| | | | |
|---|---|---|---|
| 6,560,536 | B1 | 5/2003 | Sullivan |
| 6,725,158 | B1 | 4/2004 | Sullivan |
| 7,583,225 | B2 | 9/2009 | Cohen |
| 7,969,352 | B2 | 6/2011 | DiLellio |
| 8,260,551 | B2 | 9/2012 | Janky |
| 8,515,670 | B2 | 8/2013 | Janky |
| 8,630,796 | B2 | 1/2014 | Sullivan |
| 9,121,932 | B2 | 9/2015 | Janky |
| 10,962,651 | B2 | 3/2021 | Liu |
| 11,513,232 | B2 | 11/2022 | Reid |
| 2004/0143392 | A1 | 7/2004 | Kilfeather |
| 2009/0174597 | A1 | 7/2009 | DiLellio et al. |
| 2013/0332072 | A1* | 12/2013 | Janky ............... G01S 19/40 701/469 |
| 2016/0011318 | A1* | 1/2016 | Cohen ............... G01S 19/42 342/357.68 |
| 2021/0208286 | A1 | 7/2021 | Turpin |
| 2021/0223406 | A1 | 7/2021 | Mu |

FOREIGN PATENT DOCUMENTS

| | | |
|---|---|---|
| CN | 106443739 A | 2/2017 |
| CN | 106646564 A | 5/2017 |
| CN | 107153209 A | 9/2017 |
| CN | 107229061 A | 10/2017 |
| CN | 107561568 A | 1/2018 |
| CN | 108415050 A | 8/2018 |
| WO | 02060195 A1 | 8/2002 |
| WO | 2015065541 A1 | 5/2015 |
| WO | 2015131064 A1 | 9/2015 |
| WO | 2018009088 A1 | 1/2018 |

OTHER PUBLICATIONS

International Search Report dated Mar. 4, 2019 from PCT Application No. PCT/CN2018/117070.
Zhao, Yi et al. "PPP Augmentation and Real-Time Precise Orbit Determination for LEO Satellites" Proceedings of the 36th Chinese Control Conference, Jul. 28, 2047, pp. 5937-5941.
Ke, Mingxing et al. "Integrating GPS and LEO to Accelerate Convergence Time of Precise Point Positioning" 2015 International Conference on Wireless Communications & Signal Processing (WCSP), Oct. 17, 2015, pp. 1-5.
Office Action dated Jun. 8, 2022 from U.S. Appl. No. 15/734,446.
Amendment dated Aug. 19, 2022 from U.S. Appl. No. 15/734,446.
Final Office Action dated Nov. 25, 2022 from U.S. Appl. No. 15/734,446.
Amendment After Final dated Jan. 23, 2023 from U.S. Appl. No. 15/734,446.
Advisory Action dated Feb. 13, 2023 from U.S. Appl. No. 15/734,446.
Request for Continued Examination and Amendment Under 37 C.F.R. § 1.114 dated Feb. 27, 2023 from U.S. Appl. No. 15/734,446.
Notice of Allowance dated Mar. 29, 2023 from U.S. Appl. No. 15/734,446.
Preliminary Amendment dated Dec. 2, 2020 from U.S. Appl. No. 15/734,341.
International Search Report dated Mar. 12, 2019 from PCT Application No. PCT/CN2018/116294.
Office Action dated Dec. 30, 2022 from U.S. Appl. No. 15/734,341.
Amendment dated Mar. 22, 2023 from U.S. Appl. No. 15/734,341.
International Search Report dated Feb. 27, 2019 for Parent PCT Appl. No. PCT/CN2018/117071.
Zhang, Peihua et al., "iGPS Exploration and Analysis of iGPS Navigation Technology" Modern Navigation, No. 2, Apr. 30, 2018, ISSN: 1674-797, pp. 88-91 and 93.
Zhang, Peihua et al., "3 The Research of Enhancing Orbit Determination with Satellite-Based Observations in Three Station Layouts", Journal of Geomatics Science and technology, vol. 34, No. 5, Oct. 31, 2017, ISSN: 1673-6338, pp. 445, 446, and 449.

* cited by examiner

NAVIGATION ENHANCEMENT METHOD AND SYSTEM

CROSS REFERENCE TO RELATED APPLICATION

The present application claims the priority of a Chinese patent application filed with the Chinese Patent Office with an application number of 201810566046.8 on Jun. 4, 2018, and the entire contents of which are incorporated into the present application by reference.

TECHNICAL FIELD

The present application relates to the technical field of satellite navigation, and for example to a positioning method and system for navigation augmentation.

BACKGROUND

Related Global Navigation Satellite Systems (GNSS), including Beidou, Global Positioning System (GPS), Global Navigation Satellite System (GLONASS), Galileo and the like, only provide navigation and positioning services better than 10 meters, for users, which can no longer meet requirements for high-precision of users.

With the advancement and development of core technologies such as real-time orbit and clock bias, and Precise Point Positioning technology, the medium- and high-orbit satellite augmentation systems represented by Navcom's StarFire system and Fugro's OmniStar system make the differential positioning system reach a new stage. However, the schemes of the above-mentioned systems are basically similar, and all rent transparent transponders on maritime satellites to forward navigation system augmentation information for user terminals, to provide high-precision positioning services. The convergence speed of the accuracy of the services obtained by users is closely related to the spatial geometric configuration and the change rate of the geometric configuration of the navigation satellites, and the above-mentioned multiple system augmentation satellites are all located in medium- and high-orbits, and the angle swept by the satellites at the zenith in a short time is small, and the changes in the spatial geometric configurations of the satellites are not obvious, thus effect on accelerating the convergence of Precise Point Positioning is limited, and its convergence time still needs at least 6 minutes in the case that the ambiguity is fixed, which cannot meet the current demand for high-precision real-time positioning.

Ground-based augmentation systems and Precise Point Positioning-Real Time Kinematic (PPP+RTK) technology can quickly achieve rapid convergence of high-precision positioning, but are limited by the layout of ground stations and limitation of communication links, and thus coverage and availability of the services are low and the needs of a wide range of high-precision public applications cannot be met.

SUMMARY OF THE INVENTION

The following is an overview of the subject matters described in detail herein. The present overview is not intended to limit the scope of protection of the claims.

The present application proposes a navigation augmentation method and system, which accelerate the convergence speed of satellite navigation high-precision positioning, shorten the time for initialization of user precise positioning, eliminate dependence on communication links, and at the same time improve system service availability, accuracy and reliability.

The present application provides a navigation augmentation method to achieve rapid convergence of high-precision positioning, speed measurement and timing for users.

The present application provides a navigation augmentation system to realize rapid and high-precision positioning, speed measurement and timing services for users.

One aspect of the present application provides a navigation augmentation method, including: broadcasting, by Low Earth Orbit (LEO) satellites, navigation direct signals, navigation augmentation information, and precise orbits and clock biases of the Low Earth Orbit satellites; performing precise positioning, speed measurement and timing by a user receiver according to the navigation direct signals of navigation satellites, and the navigation direct signals of the LEO satellites, the navigation augmentation information and the precise orbits and clock biases of the Low Earth Orbit satellites broadcasted by the LEO satellites.

In an embodiment, a LEO constellation includes multiple LEO satellites distributed on multiple orbital planes, and the multiple LEO satellites broadcast navigation direct signals based on high-precision time-frequency references through specific frequency bands; the navigation augmentation information includes at least one of the following: precise orbits and clock biases of navigation satellites of global navigation satellite system GNSS, phase bias correction number of the navigation satellites, phase bias correction number of the LEO satellites, and ionospheric model parameter information.

In an embodiment, the navigation satellites include: at least one of US Global Positioning System GPS, China Beidou, EU Galileo, and Russian Global Navigation Satellite System GLONASS satellite navigation systems.

In an embodiment, observation data for precise positioning, speed measurement and timing by the user receiver includes at least one of the following: observation data of pseudo-range of the navigation satellites and the LEO satellites, observation data of carrier phase of the navigation satellites and the LEO satellites, and Doppler observation data of the navigation satellites and the LEO satellites.

In an embodiment, when the user receiver performs precise positioning, speed measurement and timing according to the navigation direct signals of navigation satellites, the navigation direct signals of the LEO satellites and the navigation augmentation information of the LEO satellites, the processing mode of the user receiver comprises: a LEO satellite augmented ambiguity float solution mode or a LEO satellite augmented ambiguity fixed solution mode.

The present application further provides a navigation augmentation system, including: a LEO constellation, which comprises multiple LEO satellites distributed on multiple orbital planes, and is configured to provide stable coverage of the world or specific service areas; a ground operation and control system, which is configured to perform business calculation and processing, and control and manage satellites and constellations; a user receiver, which is configured to receive navigation direct signals broadcasted respectively by the navigation satellites and the LEO satellites, as well as the navigation augmentation information broadcasted by the LEO satellites, and perform positioning, speed measurement and timing based on the navigation direct signals of the navigation satellites and the navigation direct signals of the LEO satellites and the navigation augmentation information broadcasted by the LEO satellites.

In an embodiment, the LEO satellites of the LEO constellation are configured with high-precision frequency references to receive, in real-time, navigation satellite observation information of global navigation satellite system GNSS, and generate and broadcast the navigation direct signals carrying the navigation augmentation information.

In an embodiment, the ground operation and control system comprises a master control station, an injection station, and a monitoring station; the master control station, the injection station, the monitoring station and the LEO satellites of the LEO constellation constitute a satellite-ground integrated system, and the working process of the satellite-ground integrated system is as follows: the monitoring station collects observation information of the navigation satellites and the LEO satellites, and sends the collected observation information of the navigation satellites and the LEO satellites to the master control station; the master control station, according to its own position information and various types of observation information, generates augmentation information of the navigation satellites including the precise orbits and the precise clock biases, and the precise orbits and the precise clock biases of the LEO satellites, and make arrangements to form the navigation augmentation Information and LEO satellite navigation information, and sends the navigation augmentation information and the LEO satellite navigation information to the injection station; the injection station sends the navigation augmentation information and the LEO satellite navigation information to the LEO satellites; the LEO satellites of the LEO constellation calculate and forecast the precise clock biases of the LEO satellites, and arrange the precise clock biases of the LEO satellites to form navigation telegrams, generate the navigation direct signals and broadcast to users, after receiving the navigation augmentation information and the LEO satellite navigation information; the user receiver receives and measures navigation satellite signals and LEO satellite signals, and analyzes the navigation augmentation information and the navigation telegrams of the LEO satellites, to perform high-precision positioning, speed measurement and timing solution.

In an embodiment, the system constructs an integrated inter-satellite and satellite-to-ground network to uniformly transmit multiple types of information.

In the integrated inter-satellite and satellite-to-ground network, the satellite receives observation information of the navigation satellites, and receives augmentation information up-injected by the master control station, and the satellite generates telemetry information, and receives ground remote control information, and then independently transmits it to target satellite and ground station through inter-satellite and satellite-to-ground link network.

In an embodiment, the master control station includes: a first calculation unit, which is configured to calculate precise orbit and clock bias correction number of the navigation satellite according to the position information of the master control station itself, the collected on-satellite receiver data of the LEO satellites, and the observation data of the navigation satellite and the LEO satellites at the monitoring station; a second calculation unit, which is configured to calculate system time reference according to its own position information, the collected on-satellite receiver data of the LEO satellites, and the observation data of the navigation satellite and the LEO satellites at the monitoring station, and calculate the precise orbits and the precise clock biases of the LEO satellites, and navigation relative clock bias according to the system time reference; an information arrangement unit, which is configured to respectively generate the navigation telegrams according to the precise orbit and clock bias correction number of the navigation satellite and the precise orbits and the precise clock biases of the LEO satellites, and send the navigation telegrams to the injection station to inject into the LEO satellites.

After reading and understanding the drawings and the detailed description, other aspects can be understood.

BRIEF DESCRIPTION OF THE DRAWINGS

The drawings are only used to illustrate example embodiments, and are not considered as limitation to the present application. And throughout the drawings, the same reference symbols are used to denote the same components. In the drawings.

DETAILED DESCRIPTION OF THE PREFERRED EMBODIMENT

Hereinafter, exemplary embodiments of the present disclosure will be described in more detail with reference to the accompanying drawings. Although the drawings show exemplary embodiments of the present disclosure, it should be understood that the present disclosure can be implemented in various forms and should not be limited by the embodiments set forth herein. On the contrary, these embodiments are provided to enable a more thorough understanding of the present disclosure and to fully convey the scope of the present disclosure to those skilled in the art.

Those skilled in the art can understand that, unless otherwise defined, all terms (including technical terms and scientific terms) used herein have the same meanings as commonly understood by those of ordinary skill in the art to which the present application belongs. It should also be understood that, terms such as those defined in general dictionaries should be understood to have meanings consistent with the meanings in the context of the relevant technology, and unless specifically defined, they will not be explained in idealized or overly formal meanings.

In order to improve the accuracy of satellite navigated positioning, speed measurement and timing, and to reduce the convergence time of high-precision services, embodiments of the present application provide a navigation augmentation method and system, in which by constructing a LEO satellite constellation, a high-precision frequency reference is configured at the LEO satellites, navigation direct signals, GNSS augmentation information, and high-precision LEO satellite navigation telegrams are broadcasted to users, and observation geometry is improved by using fast moving characteristics of the LEO satellites relative to users, to enable quick separation ambiguity parameters from position parameters, thereby accelerating the convergence speed of high-precision services, and improving the accuracy and reliability of satellite navigation services through navigation augmentation signal broadcasting at the same time. Wherein the LEO satellite constellation refers to satellites with an orbital altitude of 600 kilometers to 1200 kilometers.

The navigation augmentation method and system provided by embodiments of the present application augment geometric configuration of user observation space by means of the fast moving characteristics of the LEO satellites, accelerate the convergence speed of satellite navigated high-precision navigation positioning solution, shorten the time for initialization of user precise positioning, and at the same time improve system service availability, accuracy and reliability. The user receiver has the same hardware structure as the general satellite navigation receiver, and it only needs to receive direct signals from the navigation satellites and the LEO satellites in one direction to achieve rapid and precise positioning and does not need to consider other data communication links, which effectively reduces the complexity and price of high-precision positioning for users.

The navigation augmentation method provided by an embodiment of the present application, including: broadcasting, by LEO satellites, navigation direct signals and navigation augmentation information; performing, by a user receiver, precise positioning, speed measurement and timing according to the navigation direct signals of navigation satellites, the navigation direct signals of the LEO satellites and the navigation augmentation information of the LEO satellites.

Figure 1:
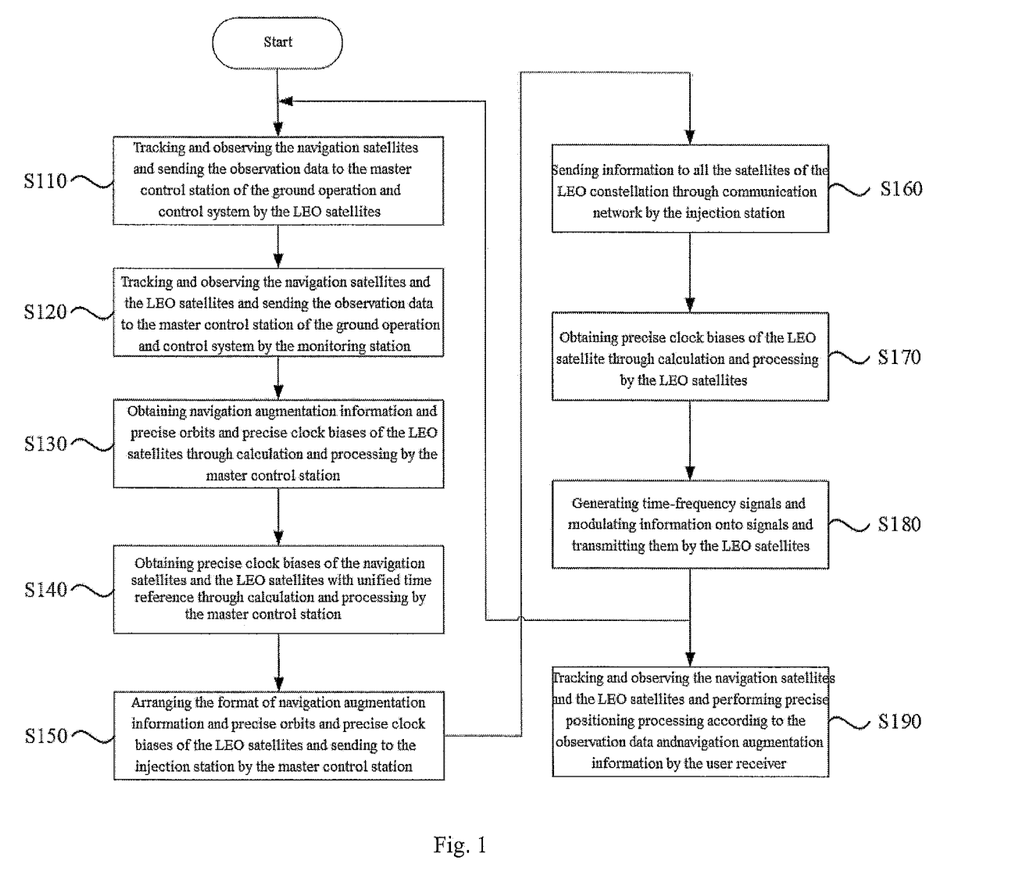
FIG. 1 is a schematic diagram of a navigation augmentation method provided by an embodiment of the present application.

FIG. 1 is a flowchart of a navigation augmentation method provided by an embodiment of the present application. As shown in FIG. 1, the method includes steps S110 to S190.

In the step S110, the LEO satellites use the on-satellite GNSS receiver to track and observe the navigation satellites in the visible range, acquire original observation data and navigation telegrams, and then send the original observation data and the navigation telegrams to the master control station of the ground operation and control system through the integrated communication network including inter-satellite link and satellite-to-ground link.

In the step S120, the ground operation and control system uses the monitoring station to track and observe the navigation satellites and the LEO satellites in the visible range, acquire original observation data and navigation telegrams, and then send the original observation data and the navigation telegrams to the master control station of the ground operation and control system through the ground network.

In the step S130, the master control station of the ground operation and control system obtains navigation augmentation information including precise orbits and precise clock biases of the navigation satellites, global ionospheric model parameters, and precise orbits and precise clock biases of the LEO satellites by calculation and processing according to the original observation data and the navigation telegrams acquired by the on-satellite GNSS receiver of the LEO satellites, as well as the original observation data and the navigation telegrams acquired by the ground monitoring station.

In the step S140, the master control station of the ground operation and control system performs comprehensive atomic time processing according to the precise clock biases of the navigation satellites, establishes and maintains a unified system time reference, and then corrects the precise clock biases of the navigation satellites to acquire precise clock biases of the navigation satellites and the LEO satellites with unified time reference.

In the step S150, the master control station of the ground operation and control system arranges all navigation augmentation information as well as precise orbits and precise clock biases of the LEO satellites in a prescribed format, and then sends them to the injection station for up-injection.

In the step S160, the injection station of the ground operation and control system sends the navigation augmentation information as well as the precise orbits and precise clock biases of the LEO satellites to all the satellites of the LEO constellation through the satellite-to-ground and inter-satellite integrated communication network.

In the step S170, the LEO satellites perform local clock bias calculation and forecasting according to the observation information of the on-satellite GNSS receiver, the navigation augmentation information, and the precise orbits of the LEO satellites by taking the up-injected precise clock biases of the LEO satellite as reference, to form precise clock bias broadcasting products of the LEO satellites.

In the step S180, the LEO satellites generate time-frequency signals based on the local high-precision time reference, and then modulate the navigation satellite augmentation information and precise orbits and precise clock biases of the LEO satellites on radio frequency signals, and then transmit them to the ground through the satellite antenna.

In the step S190, the user receiver tracks and observes the navigation satellites and the LEO satellites in the visible range, and acquires original observation data of the navigation satellites and the LEO satellites, as well as navigation satellite augmentation information, precise orbits and precise clock biases of the LEO satellites and the like, and performs precise positioning, speed measurement and timing processing according to the above data.

Figure 2:
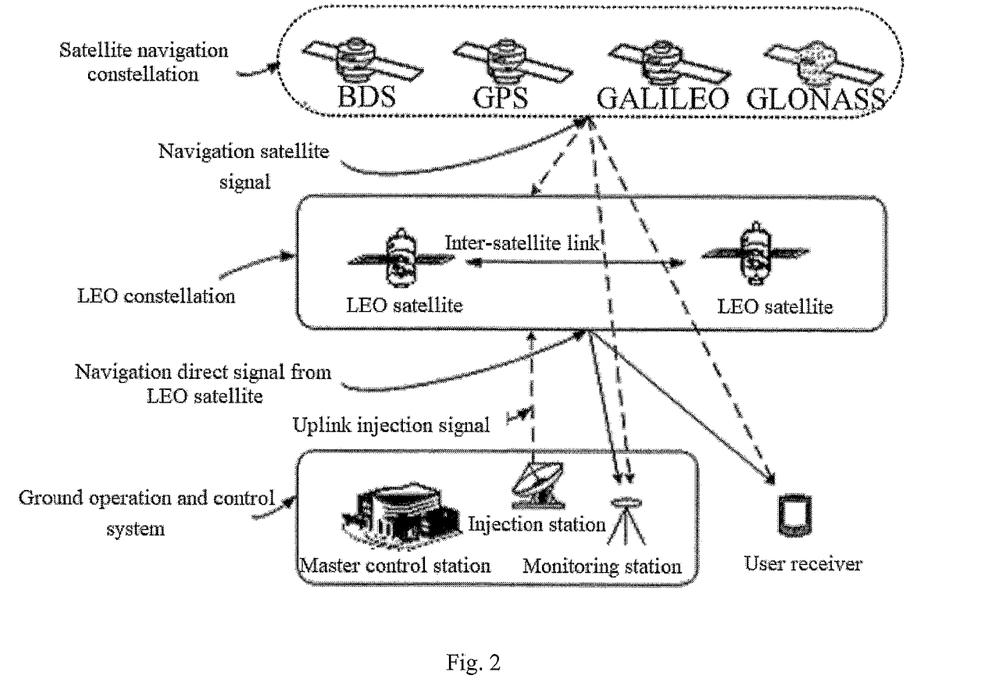
FIG. 2 is a flowchart of a navigation augmentation method provided by an embodiment of the present application.

FIG. 2 is a schematic diagram of the working principle of a navigation augmentation method provided by an embodiment of the present application. Wherein the implementation of the navigation augmentation method mainly include a navigation satellite constellation, a LEO constellations, a ground operation and control system, and a user receiver. Wherein: the navigation satellite constellation includes at least one of the US GPS, China Beidou, EU Galileo and Russian GLONASS satellite navigation systems, and is configured for broadcasting navigation satellite signals. The LEO constellation includes multiple LEO satellites distributed on multiple orbital planes which broadcast navigation direct signals based on high-precision time-frequency references through specific frequency bands to provide stable coverage of the world or specific service areas, and is configured for broadcasting navigation direct signals and navigation augmentation information. The ground operation and control system performs business calculation and processing, and controls and manages the satellites and the constellations. The user receiver receives navigation direct signals broadcasted by the navigation satellites and the LEO satellites as well as the navigation augmentation information broadcasted by the LEO satellites, and performs precise positioning, speed measurement and timing based on the navigation direct signals from the navigation satellites and the LEO satellites and the navigation augmentation information.

Figure 3:
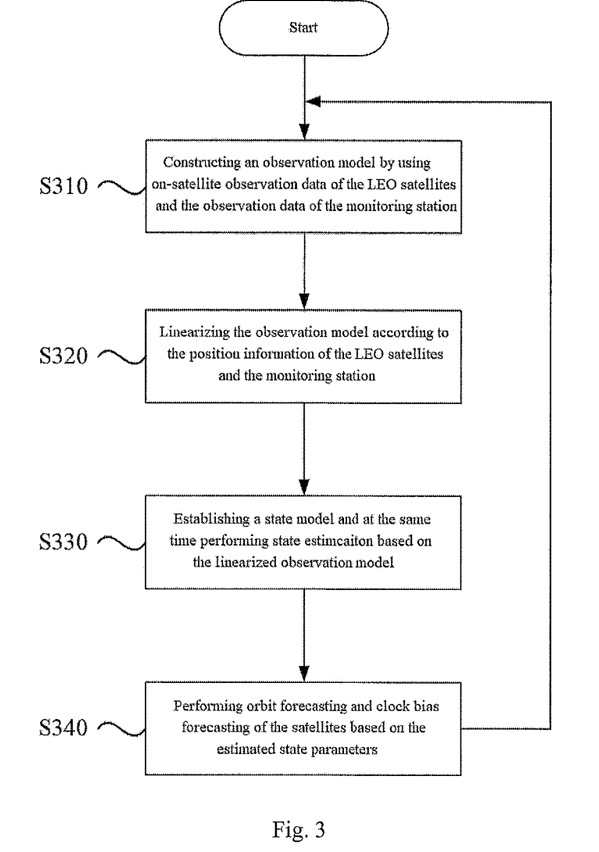
FIG. 3 is a flowchart of calculation and processing of navigation augmentation information and precise orbits and precise clock biases of LEO satellites by the master control station provided by an embodiment of the present application.

FIG. 3 is a flowchart of calculation and processing of navigation augmentation information and precise orbits and precise clock biases of LEO satellites by the master control station provided by an embodiment of the present application. As shown in FIG. 3, the processing procedure includes steps S310 to S340.

In the step S310, an observation model is constructed according to the observation data of the on-satellite GNSS of the LEO satellites and the observation data of the monitoring station.

In the step S320, linearization processing is performed on the observation model according to the position information of the LEO satellites and the monitoring station as well as the observation data.

In the step S330, a state model is established, and at the same time the least square method or filtering method is used to estimate the parameters based on the linearized observation model, to obtain the precise orbits and precise clock biases of the navigation satellites and the precise orbits and precise clock biases of the LEO satellites.

In the step S340, orbit forecasting and clock bias forecasting of the navigation satellites and the LEO satellites are performed based on the precise orbits and precise clock biases of the navigation satellites and the precise orbits and precise clock biases of the LEO satellites, to obtain navigation satellite augmentation information and navigation telegrams of the LEO satellites.

The steps S310 and S320 include the following steps: pre-configuring reference constraint conditions; under the reference constraint conditions, calculating the linearized observation model by using the least square method or filtering.

The technical solution of the present application will be described in detail below through an embodiment. The ground station collects observation information of the GNSS satellites and the LEO satellites, including observation values of pseudo-range $\rho$ and carrier phase $\phi$ at multiple frequency points. By exemplifying observation information of the GNSS, the observation values of pseudo-range and phase from the satellite s to the monitoring station a at the frequency point i can be expressed as:

$$\rho_{i,a}^s = R_a^s + m_a^s T_a + c\delta t_a - c\delta t^s + \gamma_i I_a^s + d_{\rho_i,a} - d_{\rho_i}^s$$

$$\phi_{i,a}^s = R_a^s + m_a^s T_a + c\delta t_a - c\delta t^s + \gamma_i I_a^s + d_{\phi_i,a} - d_{\phi_i}^s + \lambda_i N_{i,a}^s \quad (1)$$

In the equation (1), $R_a^s$ is the geometric distance between the satellite and the monitoring station; $T_a$ is the tropospheric delay parameter in the zenith direction of the monitoring station, and the mapping function corresponding thereto is $m_a^s$; c is the velocity of light in vacuum; $\delta t^s$ and $\delta t_a$ respectively are the satellite clock and the receiver clock biases;

$$\gamma_i = \frac{f_1^2}{f_i^2},$$

in which $f_i$ is the carrier frequency at the frequency point i, and the corresponding wavelength thereof is $$\lambda_i = \frac{c}{f_i};$$

$I_a^s$ is the oblique ionospheric delay; $d_{\rho_i,a}$ and $d_{\phi_i,a}$ respectively are the hardware delays of the pseudo-range and the carrier phase at the receiver side; $d_{\rho_i}^s$ and $d_{\phi_i}^s$ are the hardware delays of the pseudo-range and the carrier phase at the satellite side; $N_{i,a}^s$ is the integer ambiguity parameter.

In the above equation, error corrections such as antenna phase deviation and variation, phase Wind-Up, relativistic effect of satellite clock bias, and errors such as multipath and observation value noises are ignored.

In the equation (1), the zenith tropospheric delay parameter $T_a$ and the receiver clock bias $\delta t_a$ are only related to the monitoring station, the satellite clock bias $\delta t^s$ is only related to the satellite, the oblique ionospheric delay parameter $I_a^s$ is related to the monitoring station and the satellite, and the hardware delay parameters of the pseudo-range and the carrier phase at the satellite side or the receiver side are mainly related to the monitoring station, the satellite, types of observation values, tracking frequency and the like, respectively.

In data processing, different types of combinations of phase and pseudo-range observation values are often constructed as needed, wherein because the influence of the first-order ionosphere is eliminated in the ionosphere-free combination, so it is widely used to construct observation model for high-precision data processing which can be expressed as:

$$\rho_{LC,a}^s = \frac{f_1^2}{f_1^2 - f_2^2}\rho_{1,a}^s - \frac{f_2^2}{f_1^2 - f_2^2}\rho_{2,a}^s = R_a^s + m_a^s T_a + c\delta t_a - c\delta t^s + d_{\rho_{LC},a} - d_{\rho_{LC}}^s$$

$$\phi_{i,a}^s = \frac{f_1^2}{f_1^2 - f_2^2}\phi_{1,a}^s - \frac{f_2^2}{f_1^2 - f_2^2}\phi_{2,a}^s =$$

$$R_a^s + m_a^s T_a + c\delta t_a - c\delta t^s + d_{\phi_{LC},a} - d_{\phi_{LC}}^s + \lambda_{LC} N_{LC,a}^s \quad (2)$$

In the equation, $\rho_{LC,a}^s$ and $\phi_{LC,a}^s$ respectively are pseudo-range and phase observation values of the ionosphere-free combination, $d_{\rho_{LC},a}$ and $d_{\phi_{LC},a}$ respectively are the hardware delays of the pseudo-range and phase observation values of the ionosphere-free combination at the receiver side the values of which are:

$$d_{\rho_{LC},a} = \frac{f_1^2}{f_1^2 - f_2^2}d_{\rho_1,a} - \frac{f_2^2}{f_1^2 - f_2^2}d_{\rho_2,a} \quad (3)$$

$$d_{\phi_{LC},a} = \frac{f_1^2}{f_1^2 - f_2^2}d_{\phi_1,a} - \frac{f_2^2}{f_1^2 - f_2^2}d_{\phi_2,a}$$

Similarly, the hardware delays $d_{\rho_{LC}}^s$ and $d_{\phi_{LC}}^s$ of the pseudo-range and phase observation values of the ionosphere-free combination at the satellite side respectively are:

$$d_{\rho_{LC}}^s = \frac{f_1^2}{f_1^2 - f_2^2}d_{\rho_1}^s - \frac{f_2^2}{f_1^2 - f_2^2}d_{\rho_2}^s \quad (4)$$

$$d_{\phi_{LC}}^s = \frac{f_1^2}{f_1^2 - f_2^2}d_{\phi_1}^s - \frac{f_2^2}{f_1^2 - f_2^2}d_{\phi_2}^s$$

In the equation, $$\lambda_{LC} = \frac{c}{f_1 + f_2}$$

is the wavelength of the observation values of ionosphere-free combination; $N_{LC,a}^s$ is the corresponding integer ambiguity parameter the value of which is:

$$N_{LC,a}^s = N_{1,a}^s + \frac{f_2}{f_1 - f_2}(N_{1,a}^s - N_{2,a}^s) \quad (5)$$

Taking into account the correlation of each parameter in the equation (2) with the monitoring stations, the satellites and the signal frequencies, etc., for multi-system observations, the equation (2) can be extended to:

$$\rho_{LC,a}^{S,s} = R_a^{S,s} + m_a^{S,s}T_a + c\delta t_a - c\delta t^{S,s} + d_{\rho_{LC},a}^{S} - d_{\rho_{LC}}^{s}$$

$$\phi_{i,a}^{S,s} = R_a^{S,s} + m_a^{S,s}T_a + c\delta t_a - c\delta t^{S,s} + d_{\phi_{LC},a}^{S} - d_{\phi_i}^{S,s} + \lambda_{LC} N_{LC,a}^{S,s} \quad (6)$$

wherein S denotes the GNSS system and the LEO satellite system. For GPS, GALILEO, GLONASS and Beidou navigation satellite systems and the like that use code division multiple access technology, the carrier frequencies of different satellites thereof are the same, so the hardware delays of the pseudo-range and carrier phase observation values at the receiver side are the same for all single-system satellites. However, because the GLONASS system uses frequency division multiple access technology, its corresponding hardware delays of the pseudo-range and phase at the receiver side are also related to the satellite (frequency), and different GLONASS satellites (frequency) correspond to different hardware delays at the receiver side.

Since in the precise orbit determination model, the clock biases of the navigation satellites will absorb the hardware delay $d_{\rho_{LC}}^s$ of the pseudo-range at the satellite side during estimation, and the hardware delay of the pseudo-range at the receiver side will be absorbed by the receiver clock bias $d_{\rho_{LC,a}}$ the observation model at this time is:

$$\rho_{LC,a}^{S,s} = R_a^{S,s} + m_a^{S,s}T_a + c\tilde{\delta t}_a^S - c\tilde{\delta t}^{S,s} \quad (7)$$

$$\phi_{LC,a}^{S,s} =$$

$$R_a^{S,s} + m_a^{S,s}T_a + c\tilde{\delta t}_a^S - c\tilde{\delta t}^{S,s} + (d_{\rho_{LC}}^s - d_{\rho_{LC,a}^s} + d_{\phi_{LC},a}^S - d_{\phi_{LC}}^{S,s}) + \lambda_{LC} N_{LC,a}^{S,s}$$

wherein, $$c\tilde{\delta t}_a = c\tilde{\delta t}_a + d_{\rho_{LC,a}^S}$$

$$c\tilde{\delta t}^{S,s} = c\tilde{\delta t}^{S,s} + d_{\rho_{LC}}^{S,s}$$

When the multi-mode navigation system is processed in combination, generally only one receiver clock bias parameter is estimated, but the foregoing indicates that the receiver clock bias parameter will absorb the hardware delay of the observation value of the pseudo-range at the receiver side, and this delay parameter is related to the signal frequency and the navigation system, which thus results in that different systems correspond to different receiver clock biases $c\tilde{\delta t}_a$. If the receiver clock bias $c\tilde{\delta t}_a^G$ corresponding to the GPS system is taken as reference, the observation model of other systems can be rewritten as:

$$\rho_{LC,a}^{S,s} = R_a^{S,s} + m_a^{S,s}T_a + c\tilde{\delta t}_a^G - c\tilde{\delta t}^{S,s} + (d_{\rho_{LC,a}^s} - d_{\rho_{LC,a}^G}) \quad (8)$$

$$\varphi_{LC,a}^{S,s} = R_a^{S,s} + m_a^{S,s}T_a + c\tilde{\delta t}_a^G - c\tilde{\delta t}^{S,s} +$$

$$(d_{\rho_{LC,a}^s} - d_{\rho_{LC,a}^G}) + (d_{\rho_{LC}}^{S,s} - d_{\rho_{LC,a}^S} + d_{\phi_{LC},a}^S - d_{\phi_{LC}}^{S,s}) + \lambda_{LC} N_{LC,a}^{S,s}$$

wherein $d_{\rho_{LC,a}^s} - d_{\rho_{LC,a}^G}$ is the difference between the hardware delays of the pseudo-range of the two systems at the receiver side, that is, the code bias.

If the difference of the time references between the different navigation systems is considered, it is necessary to introduce an additional constant bias parameter at this time, and the constant bias parameter together with the DCB parameter will constitute the Inter-System Bias (ISB) parameter. For navigation systems using code division multiple access, all satellites thereof correspond to the same ISB parameters, and because the GLONASS system uses frequency division multiple access technology, different satellites (frequencies) thereof correspond to different ISB parameters, and at this time the ISB parameters are actually the combination of different inter-system code biases, time reference differences and Inter-Frequency Biases (IFB) of different satellites in the GLONASS system. As a satellite navigation system, the LEO satellite constellation has the same positioning mathematical model as the related GNSS system, and can be regarded as a new navigation system, and it is only needed to estimate additional ISB parameters.

The equation (8) is linearized at the initial values of parameters such as a given satellite orbit, clock bias and the like. The unknown parameters mainly include: GNSS and LEO satellite orbit parameters, ground station position parameters, ground tracking station receiver clock bias, GNSS and LEO satellite clock biases, carrier phase ambiguity, zenith tropospheric delay, ISB/IFB, etc.

$$\rho_{LC,a}^{S,s} = \quad (9)$$

$$R_{a,0}^{S,s} + \frac{dR_a^{S,s}}{dr^{S,s}}\frac{dr^{S,s}}{dx^{S,s}}dx^{S,s} - \frac{dR^{S,s}}{dr_a}dr_a + m_a^{S,s}T_a + c\tilde{\delta t}_a^G - c\tilde{\delta t}^{S,s} + ISB/IFB$$

$$\varphi_{LC,a}^{S,s} = R_{a,0}^{S,s} + \frac{dR_a^{S,s}}{dr^{S,s}}\frac{dr^{S,s}}{dx^{S,s}}dx^{S,s} -$$

$$\frac{dR_a^{S,s}}{dr_a}dr_a + m_a^{S,s}T_a + c\tilde{\delta t}_a^G - c\tilde{\delta t}^{S,s} + ISB/IFB + \lambda_{LC} B_{LC,a}^{S,s}$$

wherein $$B_{LC,a}^{S,s} = N_{LC,a}^{S,s} + \frac{1}{\lambda_{LC}}(d_{\rho_{LC}}^s - d_{\rho_{LC,a}^S} + d_{\phi_{LC},a}^S - d_{\phi_{LC}}^{S,s}),$$

$R_{a,0}^{S,s}$ is the satellite-to-ground distance calculated from the initial values of the position $r^{S,s}$ of the GNSS or low-orbit satellite and the position $r_a$ of the monitoring station, $R_a^{S,s}$ can be expressed as:

$$R_a^{S,s} = \sqrt{(r^{S,s} - r_a)^2} \quad (10)$$

wherein, $r^{S,s}$ is a function of the satellite orbit parameters $x^{S,s}$ in the orbital arc.

In the equation (9), $$\frac{dR_a^{S,s}}{dr^{S,s}} \text{ and } \frac{dR_a^{S,s}}{dr_a}$$

are the directional cosine value of the observation signal, and $$\frac{dr^{S,s}}{dx^{S,s}}$$

is obtained by solving the variational equation. In addition, the partial derivative of the observation model to the receiver clock bias, satellite clock bias and ISB/IFB is 1; the partial derivative of the observation model to the ambiguity parameter is the carrier wavelength λ; the partial derivative of the observation model to the zenith tropospheric delay parameter is $m_a^{S,s}$.

The observation model after linearization in combination is used to construct normal equations and the related parameters are solved under the least squares criterion. Because the receiver clock bias, satellite clock bias, ISB and other parameters are correlated, the basic constraints need to be added when solving. When the constraint monitoring station clock bias is under the system time CST of the LEO constellation augmentation system, the clock biases and corresponding ISB/IFB parameters of all the satellites and receivers under this system can be obtained. After the satellite orbit parameter $x^{S,s}$ is obtained by solving, the continuous orbit product is obtained through kinetics integration.

In practical applications, after the user terminal receives the GNSS data, the satellite navigation system augmentation information and the LEO satellite navigation information downlink-broadcasted by the LEO satellites, when calculating the time and space reference of the user, because the navigation and the LEO satellite orbit and the navigation system augmentation information are known, and they do not need to be estimated, and at this time the equation (9) can be rewritten as:

$$\rho_{LC,a}^{S,s} = R_{a,0}^{S,s} - \frac{dR_a^{S,s}}{dr_a}dr_a + m_t^{S,s}T_a + c\widetilde{\delta t}_a^G + ISB/IFB \quad (11)$$

$$\phi_{LC,a}^{S,s} = R_{a,0}^{S,s} - \frac{dR_a^{S,s}}{dr_a}dr_a + m_a^{S,s}T_a + c\widetilde{\delta t}_a^G + ISB/IFB + \lambda_{LC}B_{LC,a}^{S,s}$$

wherein $dr_a$, $c\widetilde{\delta t}_a^G$ and ISB/IFB parameters are the position and clock bias of the ground user in a specific time-space frame, which can be solved by using batch processing based on least squares or can be processed by a filtering algorithm.

Figure 4:
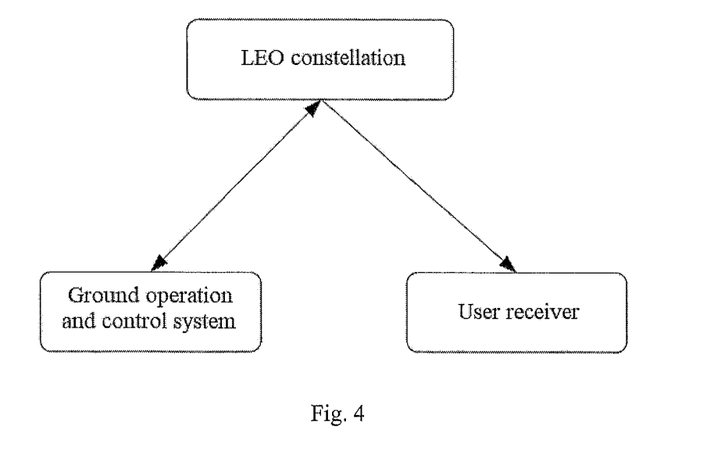
FIG. 4 is a structural diagram of a navigation augmented positioning system provided by an embodiment of the present application.

FIG. 4 is a structural diagram of a navigation augmented positioning system provided by an embodiment of the present application. As shown in FIG. 4, the system includes: a LEO constellation, which provides stable coverage of the world or specific service areas; and a ground operation and control system, which performs business calculation and processing, and controls and manages satellites and constellations; and a user receiver, which receives direct signals of the navigation satellites and the LEO satellite direct signals, and performs calculation processing for precise positioning, timing and speed measurement.

The LEO satellite constellation (with altitude of 600 km to 1200 km) is configured with high-precision frequency references, receives in real-time navigation satellite observation information of the GNSS, and generates and broadcasts the navigation direct signals carrying the navigation augmentation information; the ground operation and control system includes a master control station, an injection station, and a monitoring station; the master control station, the injection station, the monitoring station and the satellites of the LEO constellation constitute a satellite-ground integrated system.

Figure 5:
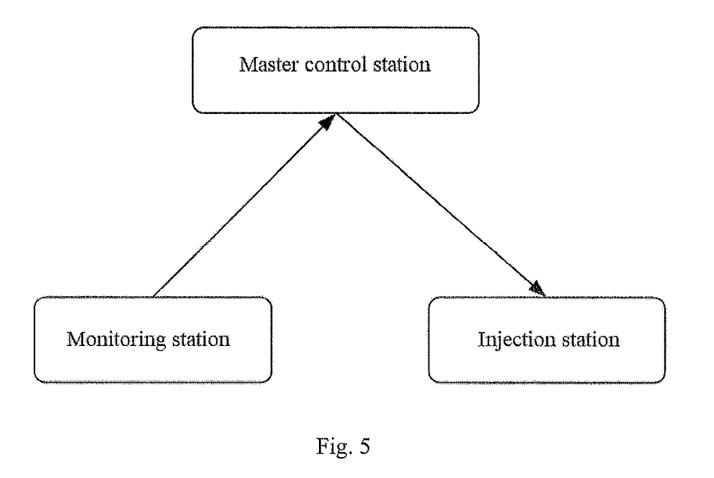
FIG. 5 is a structural diagram of a ground operation and control system in a navigation augmented positioning system provided by an embodiment of the present application.

FIG. 5 is a structural diagram of a ground operation and control system in a navigation augmented system provided by an embodiment of the present application. As shown in FIG. 5, the system includes a master control station, an injection station, and a monitoring station. The monitoring station collects observation information of GNSS satellites and the LEO satellites, and sends the collected observation information of the GNSS satellites and the LEO satellites to the master control station; the master control station, according to the position information of the LEO satellites and the monitoring station and various types of observation information, generates augmentation information of the navigation satellites, such as the precise orbits and the precise clock biases and the like, and the precise orbits and the precise clock biases of the LEO satellites, and after arrangement, forms GNSS augmentation Information and LEO satellite navigation telegrams, and sends them to the injection station; the injection station sends the GNSS augmentation information and the LEO satellite navigation telegrams to the LEO satellites.

Figure 6:
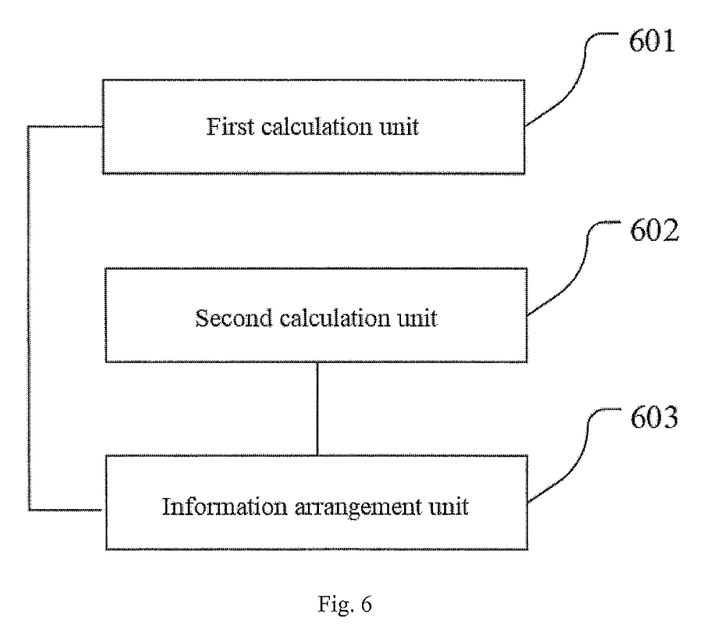
FIG. 6 is a structural diagram of a master control station of a ground operation and control system in a navigation augmented positioning system provided by an embodiment of the present application.

FIG. 6 is a structural diagram of a master control station of a ground operation and control system in a navigation augmented system provided by an embodiment of the present application. As shown in FIG. 6, the system includes a first calculation unit 601, a second calculation unit 602 and an information arrangement unit 603, wherein the first calculation unit 601 is configured to calculate precise orbit and precise clock bias of the GNSS satellite according to its own physical position information, the GNSS data collected by the on-satellite receiver of the LEO satellites, and the observation information of the GNSS satellite and the LEO satellites; the second calculation unit 602 is configured to calculate time reference of the system according to its own physical position information, the GNSS data collected by the on-satellite receiver of the LEO satellites, and the observation information of the GNSS satellite and the LEO satellites, and calculate the precise orbits and the precise clock biases of the LEO satellites and relative clock bias of the GNSS relative to the system time reference according to the system time reference; the information arrangement unit 603 is configured to respectively generate the GNSS augmentation information and the navigation telegrams of the LEO satellites according to the precise orbit and the precise clock bias of the GNSS satellite and the precise orbits and the precise clock biases of the LEO satellites, and send the GNSS augmentation information and the navigation telegrams of the LEO satellites to the injection station.

In an embodiment, the first calculation unit 601 is configured to construct an observation model of GNSS; according to its own physical position information, the GNSS data collected by the on-satellite receiver of the LEO satellites, and the observation information of the GNSS satellite and the LEO satellites, perform linearization processing on the observation model; calculate the linearized observation model by using the least square method or filtering, to obtain the precise orbit and precise clock bias of the navigation satellites.

The calculation unit 601 is further configured to pre-configure basic constraint conditions; under the basic constraint conditions, calculate the linearized observation model by using the least square method or filtering.

It should be noted that the operation of the second calculation unit 602 to calculate precise orbits and precise clock biases of the LEO satellites is similar to the operation of the first calculation unit 601 to calculate the precise orbit and the precise clock bias of the GNSS, which will not be described in the embodiment of the present application. For similarities, please refer to the implementation of the first calculation unit.

Regarding the system embodiment, because it is basically similar to the method embodiment, the description thereof is relatively simple, and for related parts, please refers to the part of the description of the method embodiment.

The navigation augmented method and system provided by the embodiments of the present application integrate high-, medium- and low-orbit navigation satellites, and make full use of the advantages, to ensure that the results of positioning, speed measurement, and timing for users are continuous, effective, and reliable, and achieve rapid or even instantaneous high-precision services in a large-scale range.

The invention claimed is:

1. A navigation augmentation method, comprising:
   collecting, by a monitoring station of a ground operation and control system, first observation information of the navigation satellites and the LEO satellites, and sending the collected first observation information to a master control station of the ground operation and control system;
   observing, by the LEO satellites, the navigation satellites to acquire second observation information, and sending the second observation information to the master control station through a communication network including an inter-satellite link and a satellite-to-ground link;
   generating, by the master control station, augmentation information of the navigation satellites including the precise orbits and the precise clock biases of the navigation satellites, and the precise orbits and the precise clock biases of the LEO satellites, based on the first observation information and the second observation information, making arrangements to form the navigation augmentation information and LEO satellite navigation information, and sending the navigation augmentation information and the LEO satellite navigation information to an injection station of the ground operation and control system;
   sending, by the injection station, the navigation augmentation information and the LEO satellite navigation information to the LEO satellites;
   calculating and forecasting, by the LEO satellites, local clock biases, arranging the local clock biases to form navigation telegrams, generating navigation direct signals of the LEO satellites, after receiving the navigation augmentation information and the LEO satellite navigation information;
   broadcasting, by Low Earth Orbit LEO satellites, navigation direct signals of the LEO satellites, navigation augmentation information and precise orbits and clock biases of the Low Earth Orbit satellites; and
   performing precise positioning, speed measurement and timing by a user receiver according to navigation direct signals of navigation satellites, and the navigation direct signals of the LEO satellites, the navigation augmentation information and the precise orbits and clock biases of the Low Earth Orbit satellites broadcasted by the LEO satellites.

2. The method as claimed in claim 1, wherein a LEO constellation comprises multiple LEO satellites distributed on multiple orbital planes, and the multiple LEO satellites broadcast navigation direct signals based on high-precision time-frequency references through specific frequency bands; the navigation augmentation information further comprises at least one of the following: phase bias correction number of the navigation satellites, phase bias correction number of the LEO satellites, and ionospheric model parameter information.

3. The method as claimed in claim 1, wherein the navigation satellites comprise: at least one of US Global Positioning System GPS, China Beidou, EU Galileo, and Russian Global Navigation Satellite System GLONASS satellite navigation systems.

4. The method as claimed in claim 1, wherein observation data for precise positioning, speed measurement and timing by the user receiver includes at least one of the following: observation data of pseudo-range of the navigation satellites and the LEO satellites, observation data of carrier phase of the navigation satellites and the LEO satellites, and Doppler observation data of the navigation satellites and the LEO satellites.

5. The method as claimed in claim 1, wherein when the user receiver performs precise positioning, speed measurement and timing according to the navigation direct signals of navigation satellites, the navigation direct signals of the LEO satellites, the navigation augmentation information and the precise orbits and clock biases of the LEO satellites, the processing mode of the user receiver comprises: a LEO satellite augmented ambiguity float solution mode or a LEO satellite augmented ambiguity fixed solution mode.

6. A navigation augmentation system, comprising:
   a LEO constellation, which comprises multiple LEO satellites distributed on multiple orbital planes, and is configured to provide stable coverage of the world or specific service areas;
   a ground operation and control system, which is configured to perform business calculation and processing, and control and manage satellites and constellations;
   a user receiver, which is configured to receive navigation direct signals broadcasted respectively by navigation satellites and the LEO satellites, as well as navigation augmentation information broadcasted by the LEO satellites, and perform precise positioning, speed measurement and timing based on the navigation direct signals of the navigation satellites, the navigation direct signals of the LEO satellites and the navigation augmentation information broadcasted by the LEO satellites;
   wherein the ground operation and control system comprises a master control station, an injection station, and a monitoring station; the master control station, the injection station, the monitoring station and the LEO satellites of the LEO constellation constitute a satellite-ground integrated system, and the working process of the satellite-ground integrated system is as follows:
   the monitoring station collects observation information of the navigation satellites and the LEO satellites, and sends the collected observation information of the navigation satellites and the LEO satellites to the master control station;
   the master control station, according to its own position information and the observation information of the navigation satellites and the LEO satellites, generates augmentation information of the navigation satellites including the precise orbits and the precise clock biases of the navigation satellites, and the precise orbits and the precise clock biases of the LEO satellites, and make arrangements to form navigation augmentation information and LEO satellite navigation information, and sends the navigation augmentation information and the LEO satellite navigation information to the injection station;

the injection station sends the navigation augmentation information and the LEO satellite navigation information to the LEO satellites;

the LEO satellites calculate and forecast local clock biases, and arrange the local clock biases to form navigation telegrams, generate the navigation direct signals and broadcast to users, after receiving the navigation augmentation information and the LEO satellite navigation information;

the user receiver receives and measures navigation satellite signals and LEO satellite signals, and analyzes the navigation augmentation information and the navigation telegrams of the LEO satellites, to perform high-precision positioning, speed measurement and timing solution.

7. The system as claimed in claim 6, wherein the LEO satellites of the LEO constellation are configured with high-precision frequency references to receive, in real-time, navigation satellite observation information of global navigation satellite system GNSS, and generate and broadcast the navigation direct signals carrying the navigation augmentation information.

8. The system as claimed in claim 7, wherein the system constructs an integrated inter-satellite and satellite-to-ground network to uniformly transmit multiple types of information.

9. The system as claimed in claim 8, wherein the master control station comprises:

a first calculation unit, which is configured to calculate precise orbit and clock bias correction number of the navigation satellites according to the position information of the master control station itself, the collected on-satellite receiver data of the LEO satellites, and the observation information of the navigation satellites and the LEO satellites at the monitoring station;

a second calculation unit, which is configured to calculate system time reference according to its own position information, the collected on-satellite receiver data of the LEO satellites, and the observation information of the navigation satellites and the LEO satellites at the monitoring station, and calculate the precise orbits and the precise clock biases of the LEO satellites, and navigation satellite relative clock bias according to the system time reference;

an information arrangement unit, which is configured to respectively generate the navigation telegrams according to the precise orbit and clock bias correction number of the navigation satellites and the precise orbits and the precise clock biases of the LEO satellites, and send the navigation telegrams to the injection station to inject into the LEO satellites.

* * * * *